United States Patent [19]

Lalley et al.

[11] 3,899,838

[45] Aug. 19, 1975

[54] TEACHING AID

[76] Inventors: John J. Lalley; Laurel E. Lalley, both of 3971 Causeway Dr. N.E., Lowell, Mich. 49331

[22] Filed: Dec. 13, 1973

[21] Appl. No.: 424,295

[52] U.S. Cl. .................. 35/31 G; 35/70; 35/72; 273/146
[51] Int. Cl.² .................. G09B 19/02; A63F 9/04
[58] Field of Search ......... 35/31 G, 31 F, 31 D, 69, 35/70, 72; 273/146

[56] References Cited
UNITED STATES PATENTS

| | | | |
|---|---|---|---|
| 1,246,152 | 11/1917 | Perrine | 35/31 G UX |
| 1,517,113 | 11/1924 | Greene | 273/146 |
| 2,454,655 | 11/1948 | Kirschbaum | 35/69 X |
| 3,208,754 | 9/1965 | Sieve | 273/146 |
| 3,365,819 | 1/1968 | Connell | 35/77 |
| 3,462,854 | 8/1969 | Schwartz | 35/32 |

*Primary Examiner*—Wm. H. Grieb
*Attorney, Agent, or Firm*—Harness, Dickey & Pierce

[57] ABSTRACT

A teaching aid comprises one or more polyhedrally shaped blocks, each block having an outer exterior surface formed of a plurality of oppositely spaced parallel sides. The construction facilitates displaying arithmetic problems and the like on some of the sides with the solution of the problem appearing on an opposite side. In a preferred form of the present invention, a plurality of individual blocks comprises a set adapted for demonstrating mathematical systems of varying bases.

9 Claims, 8 Drawing Figures

PATENTED AUG 19 1975

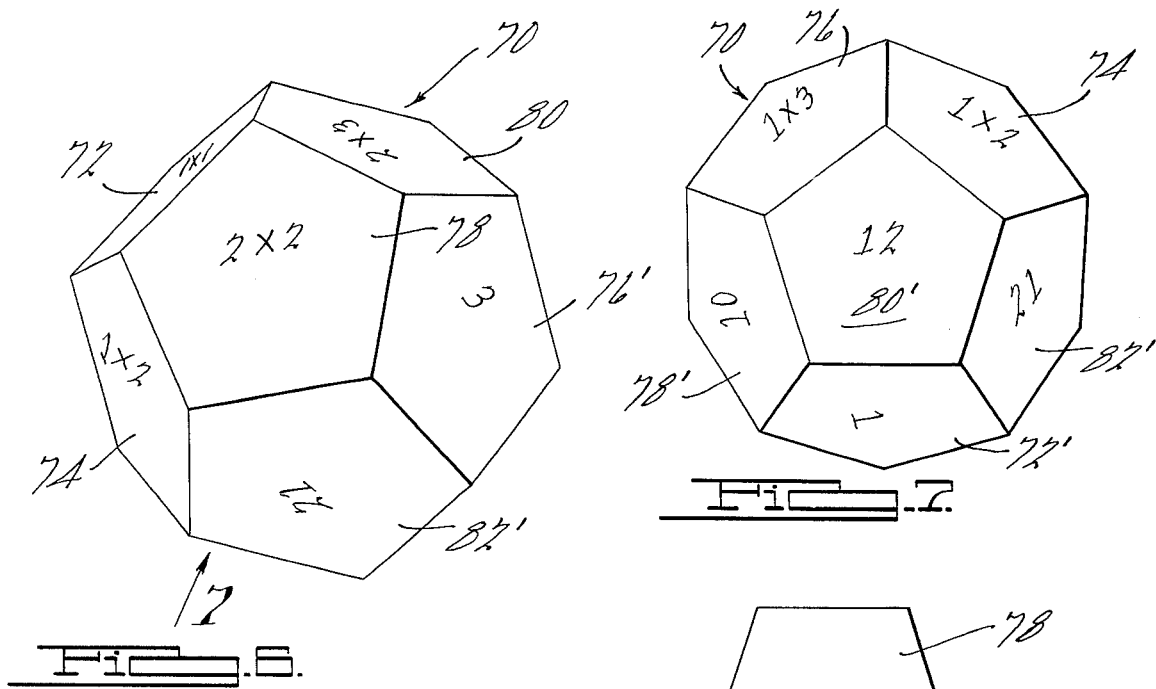
FIG. 6.
FIG. 7.
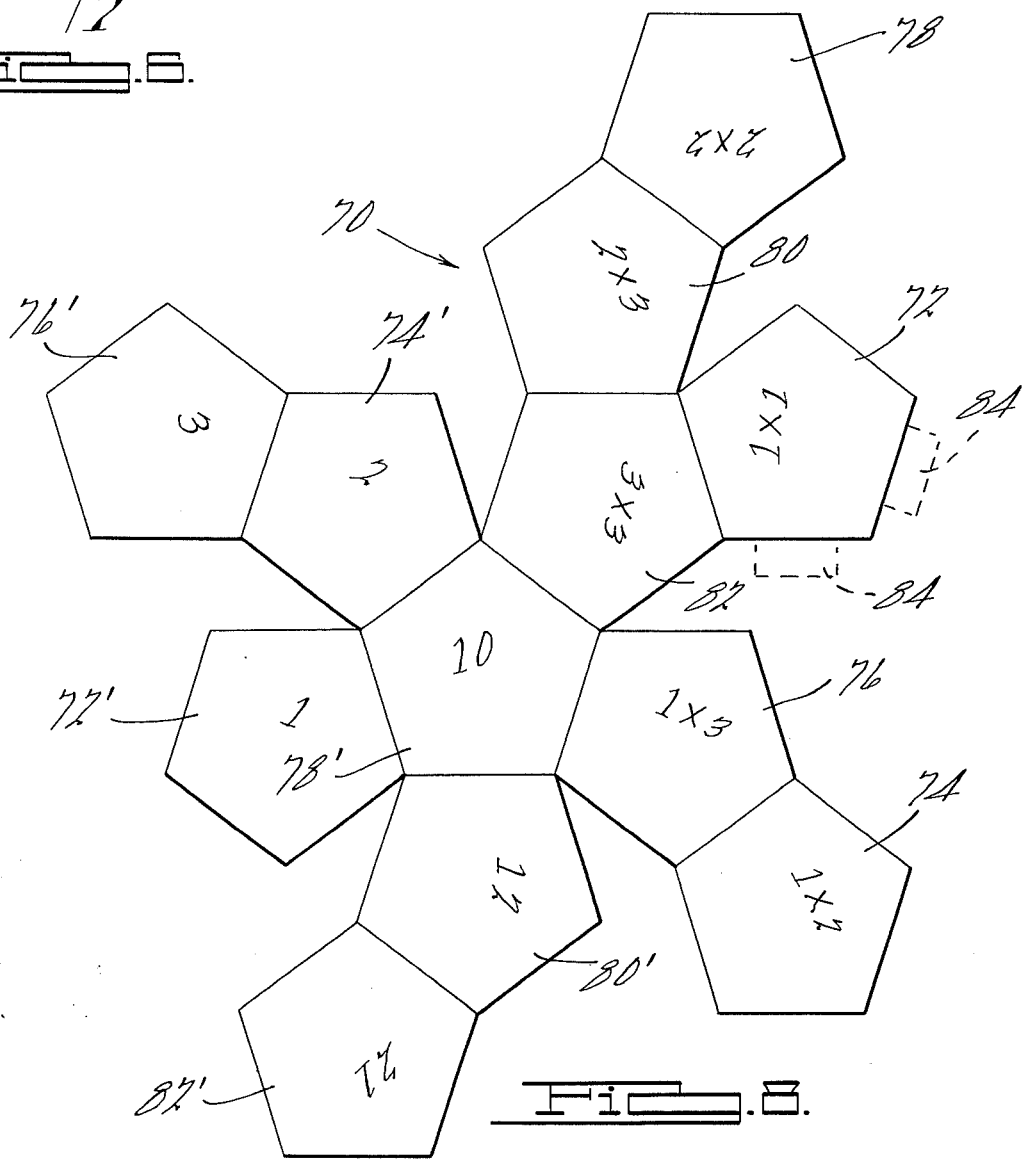
FIG. 8.

TEACHING AID

BACKGROUND AND SUMMARY OF THE INVENTION

The present invention relates generally to training devices or aids, and more particularly to one or more manipulative blocks adapted to teach the concept of various numerical systems predicated on bases other than base $_{10}$.

In the traditional methods of teaching mathematics, the disciplines of addition, subtraction, multiplication, and division of Arabic numerals are normally acquired through the process of repetitive memorization. In some instances, the use of flash cards has been found helpful in assisting the memorization process but, as will be appreciated, contribute very little in providing the student with a logical understanding of the basis of the numerical system in terms which are readily perceived. In view of the lack of positive learning tools available, a need has been recognized for new and improved learning devices which can be combined with creative educational techniques whereby to provide an improved and useful understanding of mathematics. It, therefore, is a general object of the present invention to provide a training aid which is adapted to facilitate an improved understanding of mathematics.

The concept that $2 \times 3$ is equal to 6 base$_{10}$ is eventually and usually grasped by even the poorest student. However, when confronted with the fact that $2 \times 3$ also equals 11 base$_5$, 12 base$_4$, etc., many students become dismayed due primarily to a lack of familiarity with the bases of numerical systems other than the system of the base$_{10}$. To increase this familiarity, the present invention provides one or more polyhedrally shaped blocks which for convenience of description can be defined as arithmetic "Baseballs." Each block comprises an even number of oppositely spaced, parallel sides upon which there is either an equation or an answer to an equation. The block is constructed and marked in such a manner that when the block is at rest on a substantially flat surface, such as a table top, it is solely supported by one side or surface and there is also one oppositely spaced parallel side which will face directly upward. In accordance with this arrangement, an equation is disposed on one of the sides with the solution to the equation appearing on the other in accordance with the particular base being represented by the particular block. By providing a set of "Baseballs," each being representative of a different numerical base, an increased familiarity and understanding of various numerical systems can be obtained. It, therefore, is another object of the present invention to provide a basic understanding and familiarity with numerical systems other than a system formulated to the base$_{10}$.

Another advantage of the system of the present invention is that the student's dependence on the teacher is reduced. As will be appreciated, when the correct answer to an equation is desired, the student can rotate the block to the proper equation and provide himself with the correct solution by merely reading the answer located on the opposite parallel face. Thus, it is still a further object of the present invention to reduce the student's dependence on the teacher and accordingly increase the student's confidence in understanding mathematics.

Other objects, features, and advantages of the present invention will become apparent from the subsequent description and appended claims taken in conjunction with the accompanying drawing.

BRIEF DESCRIPTION OF THE DRAWING

FIG. 6 is a perspective view of a base$_4$, 12 sided, polyhedrally shaped block;

FIG. 7 is another perspective view of the block illustrated in FIG. 6 as viewed in the direction of the arrow 7; and FIG. 8 is a development view of the block illustrated in FIGS. 6 and 7.

DETAILED DESCRIPTION OF THE PREFERRED EMBODIMENTS

With reference now to the drawings wherein a plurality of exemplary polyhedrally shaped blocks are illustrated, it will be seen that each of the blocks are formed with an even number of sides with each of the sides being marked or inscribed with either an equation or an answer to an equation. In accordance with the present invention, each of the blocks is adapted to be rolled or rotatably manipulated in such a manner that there is at most one flat side directly facing upwardly, and on this side there appears an equation or answer to an equation. Correspondingly, on a bottom oppositely spaced parallel side, there is the other of the answer to the equation or the equation for the answer.

Figure 1:
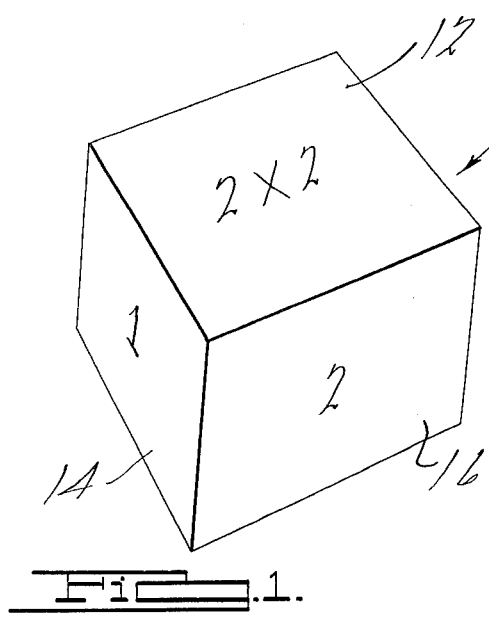
FIG. 1 is a perspective view of a base$_3$, 6 sided, polyhedrally shaped block in accordance with a first preferred embodiment of the present invention.

More particularly and with reference to FIG. 1, a cube shaped block is indicated generally at 10 and comprises six identical, square shaped sides, each of which is either marked with an equation or the answer to the equation predicated on a base$_3$ numerical system. By way of example, the block 10 can be marked with the equations $1 \times 1$, $1 \times 2$, and $2 \times 2$ with the answers 1, 2, and 11 appearing respectively on oppositely spaced, parallel sides in dependence to their corresponding equation, i.e. the equation $2 \times 2$ appears on an upper side 12 as viewed in FIG. 1 and an oppositely spaced bottom side is marked with an 11 in accordance with a base$_3$ system of numbers. Correspondingly, the sides oppositely spaced from sides indicated at 14 and 16 (marked with answers 1 and 2) are marked with the equations $1 \times 1$ and $1 \times 2$. It, therefore, will be seen that the block 10 can be rolled or rotatably manipulated whereby to locate either an equation or an answer to an equation on a lower face with the other of the equation or the answer to the equation appearing on the upper face.

Figure 2:
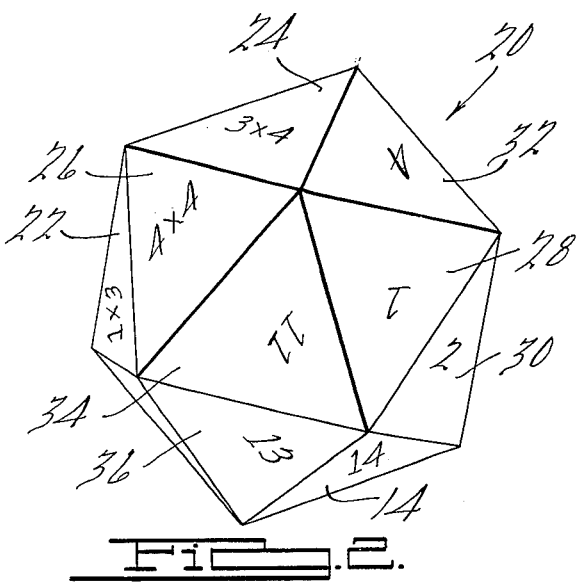
FIG. 2 is a perspective view of a base$_5$, 20 sided, polyhedrally shaped block.

In FIG. 2, a twenty sided, base$_5$, polyhedrally shaped block 20 is formed by ten pair of parallel, oppositely spaced, triangularly shaped sides. For purposes of illustration, the block 20 can be marked with the equations $1 \times 1$, $1 \times 2$, , $1 \times 3$, $1 \times 4$, $2 \times 2$, $2 \times 3$, $2 \times 4$, $3 \times 3$, $3 \times 4$, and $4 \times 4$, Accordingly, the answers are displayed on oppositely spaced sides and respectively include 1, 2, 3, 4, 4, 11, 13, 14, 22, and 31 in accordance with a base$_5$ numerical system.

Figure 3:
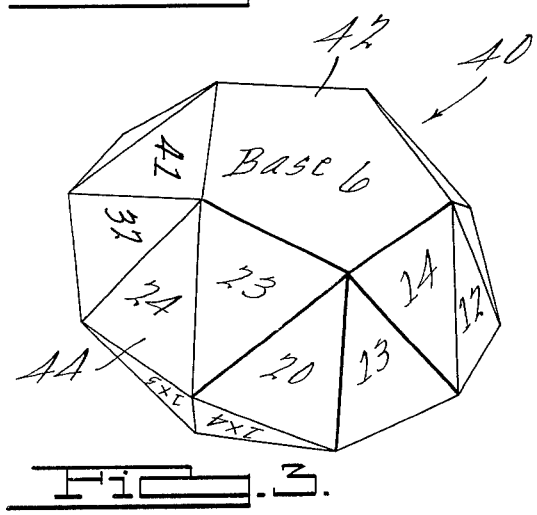
FIG. 3 is a perspective view of a base$_6$, 32 sided, polyhedrally shaped block.

An arithmetic block having equations with answers in a base$_6$ numerical system is illustrated in FIG. 3 and indicated by the numeral 40. The block 40 is comprised of two oppositely spaced pentagonal surfaces, one of which is indicated at 42, and thirty triangularly shaped side surfaces, one of which is indicated generally at 44. The pentagonally shaped surfaces 42 are preferably marked base$_6$ with the side surfaces 44 preferably including the equations $1 \times 1$, $1 \times 2$, $1 \times 3$, $1 \times 4$, $1 \times 5$, $2 \times 2$, $2 \times 3$, $2 \times 4$, $2 \times 5$, $3 \times 3$, $3 \times 4$, $3 \times 5$, $4 \times 4$, $4 \times 5$, and $5 \times 5$. Accordingly, the answers are located on oppositely spaced parallel surfaces respectively and include 1, 2, 3, 4, 5, 4, 10, 12, 14, 13, 20, 23, 24, 32, and 41.

Figure 4:
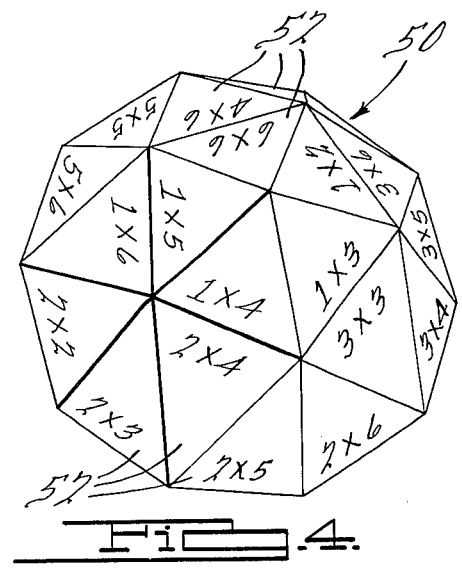
FIG. 4 is a perspective view of a base$_7$, 42 sided, polyhedrally shaped block.

A polyhedron providing solutions to equations in a base$_7$ numerical system is illustrated in FIG. 4 and indicated generally by the numeral 50. The polyhedron 50 is comprised of forty-two triangular shaped sides formed with twenty-one oppositely spaced parallel sets. The equations preferably include $1 \times 1$, $1 \times 2$, $1 \times 3$, $1 \times 4$, $1 \times 5$, $1 \times 6$, $2 \times 2$, $2 \times 3$, $2 \times 4$, $2 \times 5$, $2 \times 6$, $3 \times 3$, $3 \times 4$, $3 \times 5$, $3 \times 6$, $4 \times 4$, $4 \times 5$, $4 \times 6$, $5 \times 5$, and $6 \times 6$. Accordingly, the answers appear on each of the oppositely spaced sides and include respectively, 1, 2, 3, 4, 5, 6, 11, 13, 15, 12, 15, 21, 24, 22, 26, 33, 34, 42, and 51.

Figure 5:
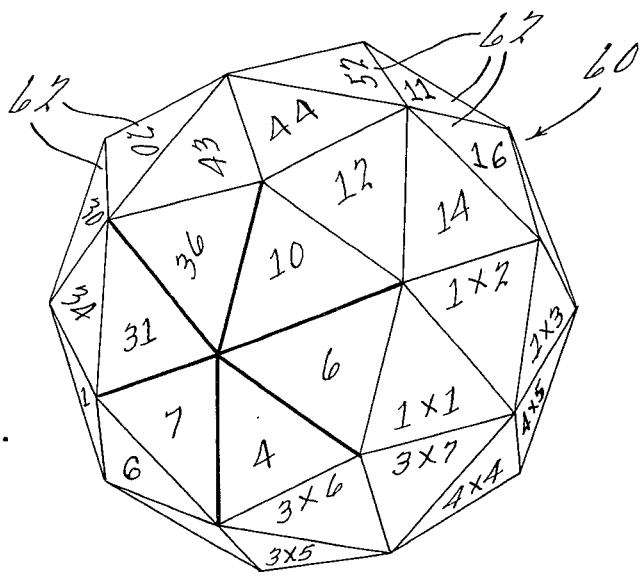
FIG. 5 is a perspective view of a base$_8$, 56 sided, polyhedrally shaped block.

A polyhedron providing solutions for equations based on a base$_8$ numerical system is indicated generally at 60 in FIG. 5. The polyhedron 60 comprises fifty-six triangular shaped side surfaces indicated generally at 62, and includes 28 sets of equations and answers located respectively on oppositely spaced, parallel sides. Preferably, the equations include $1 \times 1$, $1 \times 2$, $1 \times 3$, $1 \times 4$, $1 \times 5$, $1 \times 6$, $1 \times 7$, $2 \times 2$, $2 \times 3$, $2 \times 4$, $2 \times 5$, $2 \times 6$, $2 \times 7$, $3 \times 3$, $3 \times 4$, $3 \times 5$, $3 \times 6$, $3 \times 7$, $4 \times 4$, $4 \times 5$, $4 \times 6$, $4 \times 7$, $5 \times 5$, $5 \times 6$, $5 \times 7$, $6 \times 6$, $6 \times 7$, and $7 \times 7$. Accordingly, the answers for the above indicated equations are displayed respectively on an oppositely spaced, parallel side and include 1, 2, 3, 4, 5, 6, 7, 4, 6, 10, 12, 14, 16, 11, 14, 17, 22, 25, 20, 24, 30, 34, 31, 36, 43, 44, 52, and 61.

An exemplary method of constructing a block and an exemplary manner of operation will hereinafter appear in conjunction with a polyhedron indicated generally at 70 in FIGS. 6 and 7. The polyhedron 70 is comprised of twelve pentagonally shaped side surfaces including sides 72, 74, 78, 80, 82, and 84 marked respectively with equations $1 \times 1$, $1 \times 2$, $1 \times 3$, $2 \times 2$, $2 \times 3$, and $3 \times 3$. For purposes of clarity, the answers or solutions to the above indicated equations are indicated by the same numeral designated above, but with the addition of a prime (') suffix. Accordingly, sides 72', 76, 78', 80', and 82' are respectively marked with the answers 1, 2, 3, 10, 12, and 21. The twelve sided polyhedron 70 can be formed by any convenient construction and from any suitable material. An inexpensive version of the polyhedron 70 can easily be formed from a lay-out such as indicated in FIG. 8. With reference thereto, the pentagonal sides can be layed-out on a flat, relatively thin sheet of plastic, cardboard, paper and the like and can be provided with suitable connecting tabs, such as are indicated generally at 84. The lay-out can be cut-out and suitably folded to form the block or block 70 in accordance with the present invention. As will be appreciated, the other polyhedrons 10, 20, 40, 50, and 60 can also be formed in a similar manner with the twelve sided polyhedron 70 being described in detail by way of example. In operation and with reference to FIGS. 6 and 7, it will be seen that an equation indicated by one of the numbers 72 through 82 is easily solved by placing the side marked with the equation on a flat surface and thereafter by merely reading the answer marked on the upwardly, oppositely spaced parallel side, i.e. one of the sides designated with a prime (') suffix. It will be seen that apart from supplying the student with the right answer, the blocks are significantly more applicable to the realm of teaching mathematics from visual and creatively manipulative materials.

In accordance with the present invention, it also will be seen that various effective games can be creatively made centering upon the use of the blocks. For instance, a time element can be provided by the use of a suitable timer, and a group of students can be provided with either identical blocks or a set of blocks having differing bases. One child could work as score keeper and the others as participants for manipulating the blocks. The score keeper then recites various mathematical equations in a given period of time. The participants give a respective answer in the numerical base of the block they are assigned, and thereafter each can explain why their answer is correct including proper verification by displaying the answer disposed on the bottom of the block. Point totals can be kept as to the most correct answers, thereby leaving the teacher free as a guide to help the students if necessary, but preferably letting the children carry on their own personal learning experience.

In constructing the blocks, coloring and shape are considered to be very important. Colors should be pleasing to the child's eye, and preferably can include a variety of colors on each block such that the color of the equation corresponds to the color of the answer or each of the blocks can be provided with a different color. With respect to the shapes of the blocks, and the instructor's discretion, the blocks can be used to explore the various aspects of geometric shapes and their relationships, i.e. triangles, pentagons, etc. including a study of the angles along with the actual construction of the various geometric shapes. Accordingly, the process of determining how spherical shapes are formed, or could be formed, thereby leading to a cognitive understanding of simple shapes found in every day life relative to the learning process of mathematics.

While it will be apparent that the preferred embodiments of the present invention disclosed are well calculated to fulfill the objects and advantages above stated, it will be appreciated that the invention is susceptible to modification, variation, and change without departing from the proper scope or fair meaning of the subjoined claims.

What is claimed is:

1. A teaching aid comprising a plurality of polyhedrally shaped blocks, said blocks comprising differing numbers of sets of parallel side surfaces, each of said sets of surfaces including a first surface having first display means located thereon and defining a problem to be solved, and a second surface having second display means located thereon and providing an answer to said problem.

2. The invention as recited in claim 1 wherein said first display means defines a mathematical equation, and said second display means provides a numerical answer to said equation.

3. The invention as recited in claim 1 wherein said problem is mathematical and concerns a preselected base.

4. The invention as recited in claim 1 wherein said second display means provides an answer with respect to the base X and wherein X is a number greater than two and less than ten.

5. The invention as recited in claim 1 wherein each of said blocks is provided in a different color.

6. The invention as recited in claim 1 wherein said second display means on each of said blocks provides an answer in a differing numerical base.

7. The invention as recited in claim 6 wherein said differing numerical base is co-related to the number of sides forming said block.

8. The invention as recited in claim 1 wherein each of said sides is shaped as a square.

9. The invention as recited in claim 1 wherein each of said sides is shaped as a triangle.

* * * * *